(12) United States Patent
Becattini, Jr. et al.

(10) Patent No.: US 9,491,932 B1
(45) Date of Patent: Nov. 15, 2016

(54) PET WASTE BAG DISPENSER

(71) Applicant: Towerstar Pets, LLC, Malvern, PA (US)

(72) Inventors: Fernando Becattini, Jr., Malvern, PA (US); Fernando Becattini, Sr., Devon, PA (US); Jacquelyn N. Becattini, Malvern, PA (US); Steve A. Copeland, Barrie (CA); Mitchell Thompson, Barrie (CA)

(73) Assignee: Towerstar Pets, LLC, Malvern, PA (US)

( * ) Notice: Subject to any disclaimer, the term of this patent is extended or adjusted under 35 U.S.C. 154(b) by 0 days.

(21) Appl. No.: 15/155,598

(22) Filed: May 16, 2016

Related U.S. Application Data

(60) Provisional application No. 62/168,149, filed on May 29, 2015.

(51) Int. Cl.
*A01K 27/00* (2006.01)
*B65F 1/00* (2006.01)
*B65D 83/08* (2006.01)
*B65D 43/16* (2006.01)
*B65D 85/62* (2006.01)
*E01H 1/12* (2006.01)

(52) U.S. Cl.
CPC ............ *A01K 27/008* (2013.01); *B65D 43/16* (2013.01); *B65D 83/0805* (2013.01); *B65D 85/62* (2013.01); *B65F 1/0006* (2013.01); *E01H 1/1206* (2013.01); *B65F 2240/136* (2013.01); *E01H 2001/128* (2013.01)

(58) Field of Classification Search
CPC .......... E01H 1/1206; E01H 2001/128; E01H 2001/1286; E01H 2001/1273; E01H 2001/1293; A01K 27/008; A01K 23/005; A47K 2010/3266; A47K 10/3827; A47K 10/421; A47K 2010/3233; A47K 2010/389; B65D 83/0805

USPC ............... 119/161, 867, 858, 795; 294/1.3; 206/233; 221/45
See application file for complete search history.

(56) References Cited

U.S. PATENT DOCUMENTS

| | | | | |
|---|---|---|---|---|
| D262,422 S | * | 12/1981 | Ortiz | D3/273 |
| 4,978,095 A | * | 12/1990 | Phillips | A47K 10/38 206/233 |
| 5,441,017 A | * | 8/1995 | Lindsay | A01K 27/003 119/161 |
| 5,447,227 A | * | 9/1995 | Kosberg | A01K 1/035 206/223 |
| 5,560,321 A | * | 10/1996 | Hess | A01K 27/006 119/858 |
| 5,692,639 A | * | 12/1997 | Lahaussois | A47K 10/3836 221/283 |
| 6,076,717 A | * | 6/2000 | Edwards | A01K 27/004 225/106 |
| 6,085,695 A | * | 7/2000 | Miller | A01K 27/006 119/795 |
| 6,240,881 B1 | * | 6/2001 | Edwards | A01K 27/004 119/795 |
| 6,427,839 B1 | * | 8/2002 | Helfer-Grand | A45C 3/00 150/112 |
| 6,439,386 B1 | * | 8/2002 | Sauer | B65D 5/4208 206/494 |
| 6,588,375 B2 | * | 7/2003 | Benedettini | A01K 27/006 119/795 |
| 7,188,858 B2 | * | 3/2007 | Hartenstine | B62B 7/083 280/642 |

(Continued)

*Primary Examiner* — Yvonne Abbott-Lewis
(74) *Attorney, Agent, or Firm* — Sand & Sebolt

(57) ABSTRACT

A dispenser for pet waste disposal bags including a housing formed with an storage compartment and a lid moveable between open and closed positions; an opening formed in the lid providing access to the storage compartment; a plurality of disposable bags stored in the housing and accessible through the opening in the lid when the lid is in the closed position; and a cord attached to the housing. The cord may be engaged with a pet leash or pet collar and be cinched in order to tightly retain a bottom wall of the housing in close contact with an exterior surface of the pet leash or collar.

25 Claims, 10 Drawing Sheets

(56) References Cited

U.S. PATENT DOCUMENTS

| | | | |
|---|---|---|---|
| 7,195,677 B2 * | 3/2007 | Morrisey-Hawkins | A47K 10/3827 134/6 |
| 7,530,471 B2 * | 5/2009 | Cohen | A47K 10/421 221/44 |
| 7,726,513 B2 * | 6/2010 | Schlaupitz | A47K 10/421 221/45 |
| 7,931,170 B2 * | 4/2011 | Che | B65H 35/10 206/233 |
| 8,002,115 B2 * | 8/2011 | Rappaport | A45C 3/06 150/112 |
| 8,061,305 B2 * | 11/2011 | Sugalski | A01K 27/006 119/795 |
| 8,066,118 B1 * | 11/2011 | Van Tassell | A45F 3/14 206/233 |
| 8,113,381 B2 * | 2/2012 | Che | B65H 35/10 206/233 |
| 8,245,876 B2 * | 8/2012 | Gehring | B65D 83/0811 221/37 |
| 8,573,160 B1 * | 11/2013 | Knight | A01K 27/004 119/796 |
| 8,602,257 B2 * | 12/2013 | Godsell | B60N 3/101 206/225 |
| 8,720,384 B2 * | 5/2014 | Gee | A01K 27/003 119/795 |
| 8,752,729 B2 * | 6/2014 | Maccario | A47K 10/46 206/233 |
| 8,998,279 B2 * | 4/2015 | Lloyd | E01H 1/1206 294/1.3 |
| 9,004,555 B1 * | 4/2015 | Chirico | E01H 1/1206 206/223 |
| 9,198,545 B2 * | 12/2015 | D'Angelo | A47K 10/38 |
| 9,220,379 B2 * | 12/2015 | Winestock | A47K 10/3827 |
| 2006/0054107 A1 * | 3/2006 | Baker | A01K 27/006 119/795 |
| 2006/0231043 A1 * | 10/2006 | Galdo | A01K 27/006 119/796 |
| 2007/0267531 A1 * | 11/2007 | Petersen | B65D 83/0805 242/588.6 |
| 2012/0286003 A1 * | 11/2012 | Shadday | E01H 1/1206 224/191 |

\* cited by examiner

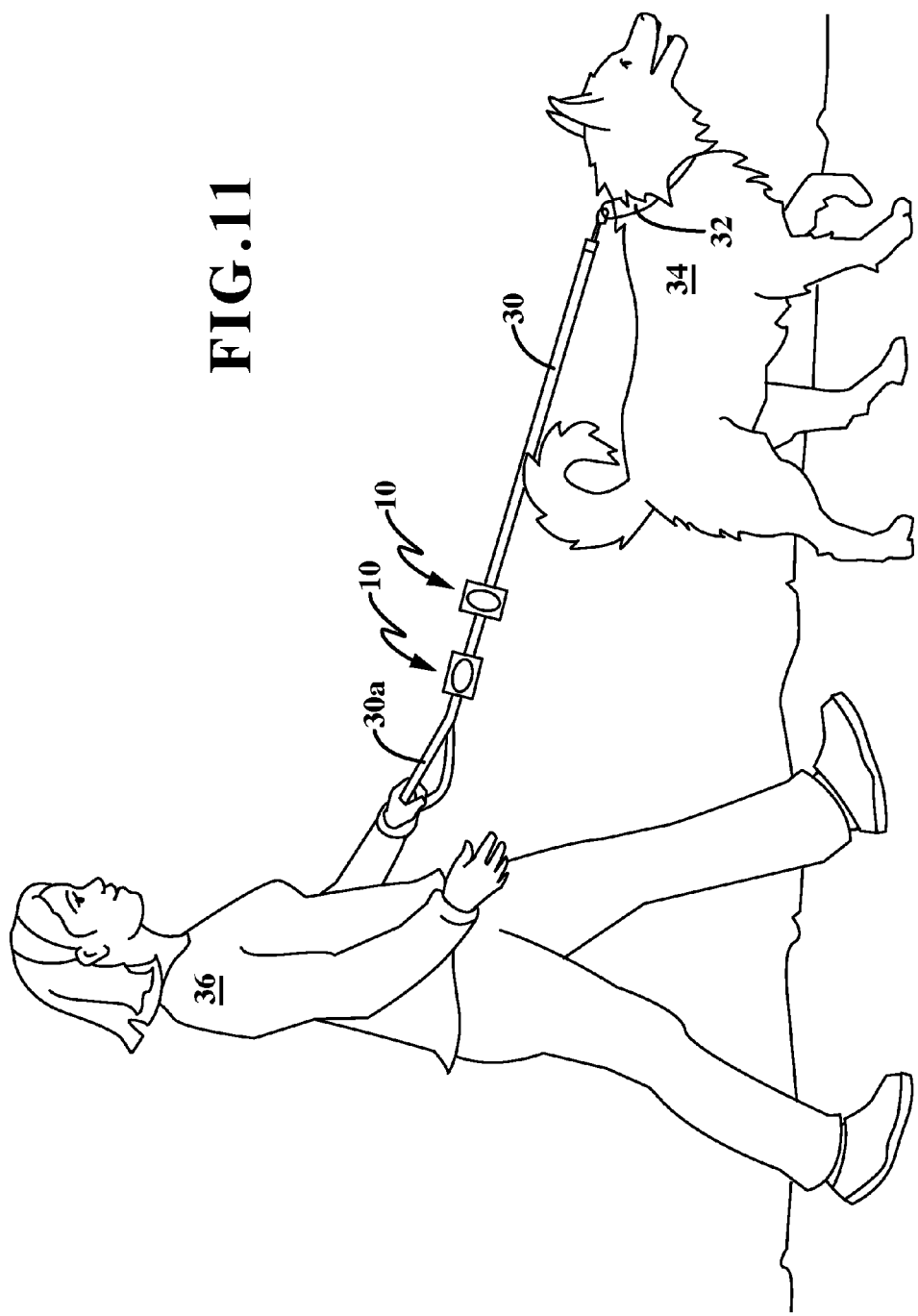

PET WASTE BAG DISPENSER

CROSS-REFERENCE TO RELATED APPLICATIONS

This application claims the benefit of U.S. Provisional Patent Application Ser. No. 62/168,149, filed May 29, 2015, the entire disclosure of which is incorporated herein by reference.

BACKGROUND OF THE INVENTION

Technical Field

The invention relates to pet supplies and particularly to a dispenser containing a plurality of pet waste disposal bags therein; where the bags are in a tissue-style arrangement within the dispenser and are able to be individually removed from the dispenser with a single hand. More specifically, the invention relates to such a dispenser having a cord, particularly an elastic cord, attached thereto in any one of a number of different possible configurations; where the cord is selectively attachable to a pet leash or collar and is able to be tightly cinched thereto, thereby enabling the pet owner to conveniently carry the dispenser and disposal bags while walking a pet.

Background Information

Pets, and in particular dogs, are owned by countless individuals who live in various parts of the country. Many of these individuals live in cities and residential areas where it is required to pick up pet feces or waste that may be "deposited" around the neighborhood while taking a pet for a walk. Obviously, picking up pet feces or waste is a slightly unpleasant task and many pet owners will carry used plastic grocery bags or pet waste bags on rolls for the purpose of picking up their pet's waste. The pet owner may need to carry more than one bag for use during a walk.

While using plastic grocery bags works satisfactory, the person walking their pet must ensure that used plastic grocery bags are available to them and that they take these bags with them every time they are heading out to walk their pet. It is readily understood that at certain times, due to the necessity of putting a collar or harness on a dog, putting on a coat or walking shoes, that the pet walker may forget to take these bags with them. This may present a problem for the owner because they will then be unable to pick up their pet waste and dispose of it properly.

There are some waste disposal bag dispensers in use that are able to be attached to a leash and are configured to carry a number of disposal bags therein. These dispensers are often cylindrical in shape and are configured to carry a roll of disposal bags in their interior. The dispenser will typically be engaged with the leash by way of a carabiner or other type of clip that attaches to one end of the dispenser and is then clipped to the leash or to a collar worn by the animal. The dispenser thus hangs generally perpendicularly downwardly from the carabiner and thereby hangs generally perpendicularly downwardly from the leash or collar. There is thus a gap between the body of the dispenser and the leash or collar. If the carabiner is clipped to the leash itself, there is a tendency for the dispenser to slide down the length of the leash and toward the dog. If the dog stops moving and sits down, the dispenser may slide for a distance back along the leash toward the handle of the leash. So the dispenser has a tendency to slide back and forth along the leash during use. Furthermore, since the dispenser is suspended from the leash, the dispenser tends to swing back and forth as the dog walks. If the dog is walking quickly or is running, this swinging motion can become extremely annoying to the user and if the dispenser slides too close to the dog's body, the dispenser may hit the dog as it swings back and forth. To try and address this problem, many owners will clip the carabiner to the dog's collar. While this positioning will stop the sliding motion back and forth along the length of the leash, it will not stop the dispenser from hitting the dog's body as the dog walks or runs. To try and address that problem, owners may clip the carabiner on the leash handle. This positioning might stop the dispenser from sliding along the leash but the dispenser now interferes with the owner's hand that grips the handle. In many instances, the carabiner cannot be easily clipped to the leash handle because of the handle's construction. Handles on retractable leashes, for instance, are configured in such a way that in many instances carabiners cannot be used to secure these dispensers to these handles. It is estimated that around 40% of U.S. dog owners use retractable leashes, so these owners would have to clip the dispensers to the leash itself or to the dog's collar.

Additionally, because the dispenser bags within these generally cylindrical dispensers are in a roll, it requires two hands for the owner to hold the dispenser, pull an end of the next bag out of the dispenser, unroll the roll of bags until a line of perforations is reached, and then tear the bag off the roll, all while holding the leash handle. This is particularly problematic because the dispenser tends to want to slide along the leash or the dispenser is attached to the handle and interferes with the owner's hand in the leash handle, or the dispenser is on the collar of a dog who is urgently trying to "take care of business".

SUMMARY

There is therefore a need in the art for an improved pet waste disposal bag dispenser that addresses these issues with the prior art.

The dispenser and attachment mechanism disclosed herein addresses these issues with the prior art. The dispenser in accordance with an aspect of the invention is secured by a cord, particularly an expandable cord, to the leash, harness or collar. The terms "leash", "harness", "collar" or "article" may be used interchangeably herein and should be understood to represent any object or article to which a user may wish to secure a dispenser for pet waste disposal bags. This dispenser and its attachment mechanism may be utilized for other bag type products in other settings as well and the description used herein should be understood to encompass those uses as well.

The overall shape of the dispenser disclosed herein with its bottom wall that is configured to rest against or abut a surface of a leash, collar other article to which the dispenser may be engaged, and the nature of the cord and attachment mechanism is such that the cord is able to tightly secure the dispenser against an exterior surface of the leash, harness or collar. One suitable configuration for the bottom wall is that the wall is flat and therefore complementary to rest against a flattened portion of the leash, collar, harness, strap or other article to which the dispenser is attached. The securement with the leash, collar, etc. is such that the dispenser remains in a fixed position relative to the leash, collar or harness and is not prone to slide along the leash or to swing back and forth relative thereto as the dog walks or runs. Instead, the dispenser tends to move in unison with the leash, collar or harness to which it has been engaged. The configuration of the dispenser is such that when secured to a collar, the dispenser will tend to lie flat against the dog's collar and against their body and therefore will not tend to swing back and forth, hitting the animal as it runs or walks. Because the dispenser's cord may be tightly cinched to the leash or collar, there is no need to secure the dispenser to the handle of the leash unless that is desired. The dispenser is also able to be secured to the leash, collar or harness in more than one orientation, making it possible for the owner to select the most favorable orientation for the particular leash, collar or animal.

Still further, the dispenser in accordance with an aspect of this invention is configured to receive disposal bags that are arranged tissue-style inside the dispenser instead of being rolled into a roll having to be torn off therefrom. The phrase "tissue-style" is used to describe the bags being arranged one on top of the other in a stack instead of being arranged end-to-end on a roll or being arranged in an overlapping formation and in a roll. The term tissue-style further may be used to describe bags that are stacked one on top of the other but where sections overlap. When sections of the stacked bags overlap, withdrawing the top bag from the stack will tend to automatically present a free end of the next highest bag in the stack in a position ready to withdraw the next bag from the container. The bags in the presently disclosed dispenser are thus stored in such a manner that they are able to be withdrawn from the dispenser one at a time using only one hand. This arrangement makes it easier and more convenient for a user to access and withdraw a single bag from the dispenser when that bag is needed. As one bag is withdrawn, the manner in which the bags are arranged within the dispenser tends to pull a free end of the next bag slightly outwardly from an aperture in the front of the dispenser, thereby making that next bag readily accessible for use.

In one aspect, the invention may provide a dispenser for pet waste disposal bags comprising a housing formed with an interior compartment, a lid moveable between open and closed positions; and a bottom wall opposite the lid; wherein the bottom wall may have a flat exterior surface that is adapted to remain in close abutting contact with an exterior surface of a pet leash or collar; an opening formed in the lid providing access to the interior compartment; a cord engaged with the housing and adapted to assist in retaining the bottom wall against the leash or collar; and a cord stop provided to lock the cord in a fixed position relative to the housing.

In another aspect, the invention may provide in combination, a leash for attachment to a pet's collar; and a dispenser for pet waste disposal bags; wherein the dispenser includes a bottom wall positionable in abutting contact with the leash or collar; an interior compartment for receiving a stack of the disposal bags; an opening to the interior compartment through which an individual bag is withdrawn; a cord engaged with the housing and being selectively cinchable about the leash or collar and tightly retaining the bottom wall of the dispenser against the leash or collar; and a cord stop that secures the cord in position relative to the housing.

In another aspect, the invention may provide a method of dispensing pet waste disposal bags comprising providing a dispenser comprising a housing formed with an interior compartment, a lid on the housing moveable between open and closed positions, an opening formed in the lid providing access to the interior compartment, a bottom wall provided on the housing opposite the lid suitable for resting against a portion of a leash or collar or other article, a cord engaged with the housing, particularly an elastic cord, and a cord stop; providing a stack of disposal bags; moving the lid to the open position; inserting the stack of disposal bags into the interior compartment; moving the lid to the closed position; engaging the cord around a section of a pet leash or a pet collar; moving the housing until the bottom wall rests against a section of the pet leash or the pet collar; and moving the cord lock to a position where the bottom wall is retained against the section of the pet leash or pet collar.

In another aspect, the invention may provide a method of dispensing pet waste disposal bags comprising providing a dispenser comprising a housing formed with an interior compartment, wherein a bottom wall of the dispenser is configured to rest against a portion of the leash or collar to which the dispenser is attached, an opening is formed in the housing that provides access to the interior compartment, a stack of disposal bags disposed within the interior compartment; a cord loop extending from the housing, and a cord stop; threading a section of the pet leash or collar through the cord loop; moving the housing until the bottom wall is in abutting contact with the pet leash or the pet collar; and moving the cord lock to a position where the bottom wall of the dispenser is retained in abutting contact with the pet leash or pet collar.

BRIEF DESCRIPTION OF THE SEVERAL VIEWS OF THE DRAWINGS

A sample embodiment of the invention is set forth in the following description, is shown in the drawings and is particularly and distinctly pointed out and set forth in the appended claims.

FIG. 11 is a diagrammatic view of a person walking a dog and showing a first dispenser engaged with the leash in a generally parallel orientation and a second dispenser engaged with the leash in a generally perpendicular orientation;

DETAILED DESCRIPTION

Figure 1:
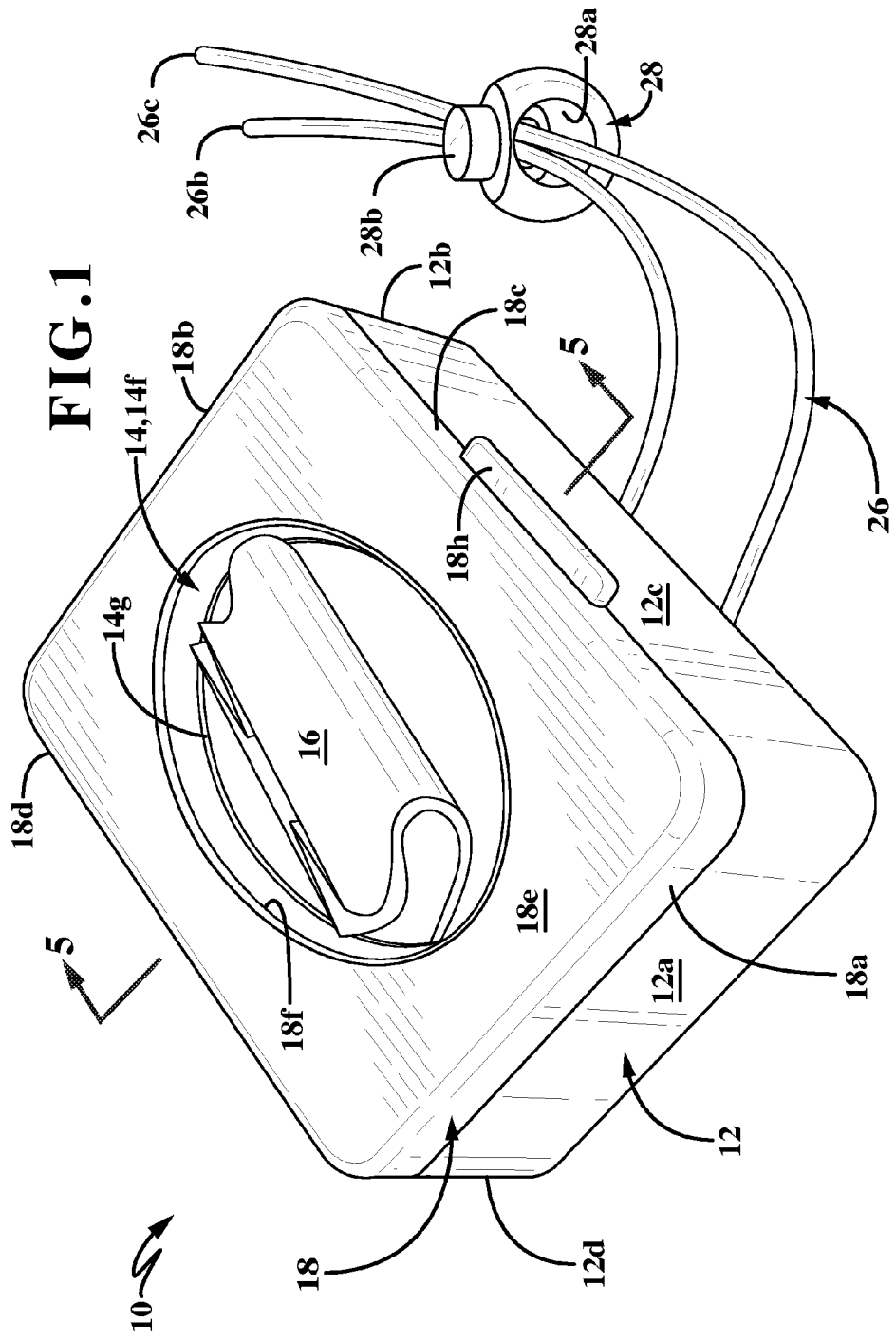
FIG. 1 is a top perspective view showing the dispenser of the present invention in combination with a box containing a plurality of the pet waste disposal bags that are retained therein in tissue-style.

The pet waste bag dispenser of the present invention is indicated generally at 10, and is shown in FIG. 1 in an assembled condition. FIG. 1 shows dispenser 10 comprising an outer housing 12 in combination with a box indicated generally at 14. Box 14 is retained within an interior of housing 12 and contains a plurality of waste disposal bags 16 therein which are arranged in a tissue-style arrangement. Bags 16 may be fabricated from plastic and are themselves disposable. The tissue-style arrangement of bags 16 within an interior compartment of box 14 enables bags 16 to be individually withdrawn from box 14.

It will be understood that box 14 may be comprised of any suitable rigid or semi-rigid material such as cardboard or paper, or the box may be in the form of a pouch made out of a material such as plastic. The term "box" used herein should be understood to represent any type of container that may be disposed within the interior of housing 12. It should further be understood that while the following description covers a dispenser that includes box 14, in other instances box 14 may be completely omitted from dispenser 10 and the bags 16 may be stacked on their own within the interior of housing 12. In this latter instance housing 12 will act as a refillable container that can be open and reloaded with a new stack of bags 16.

Figure 2:
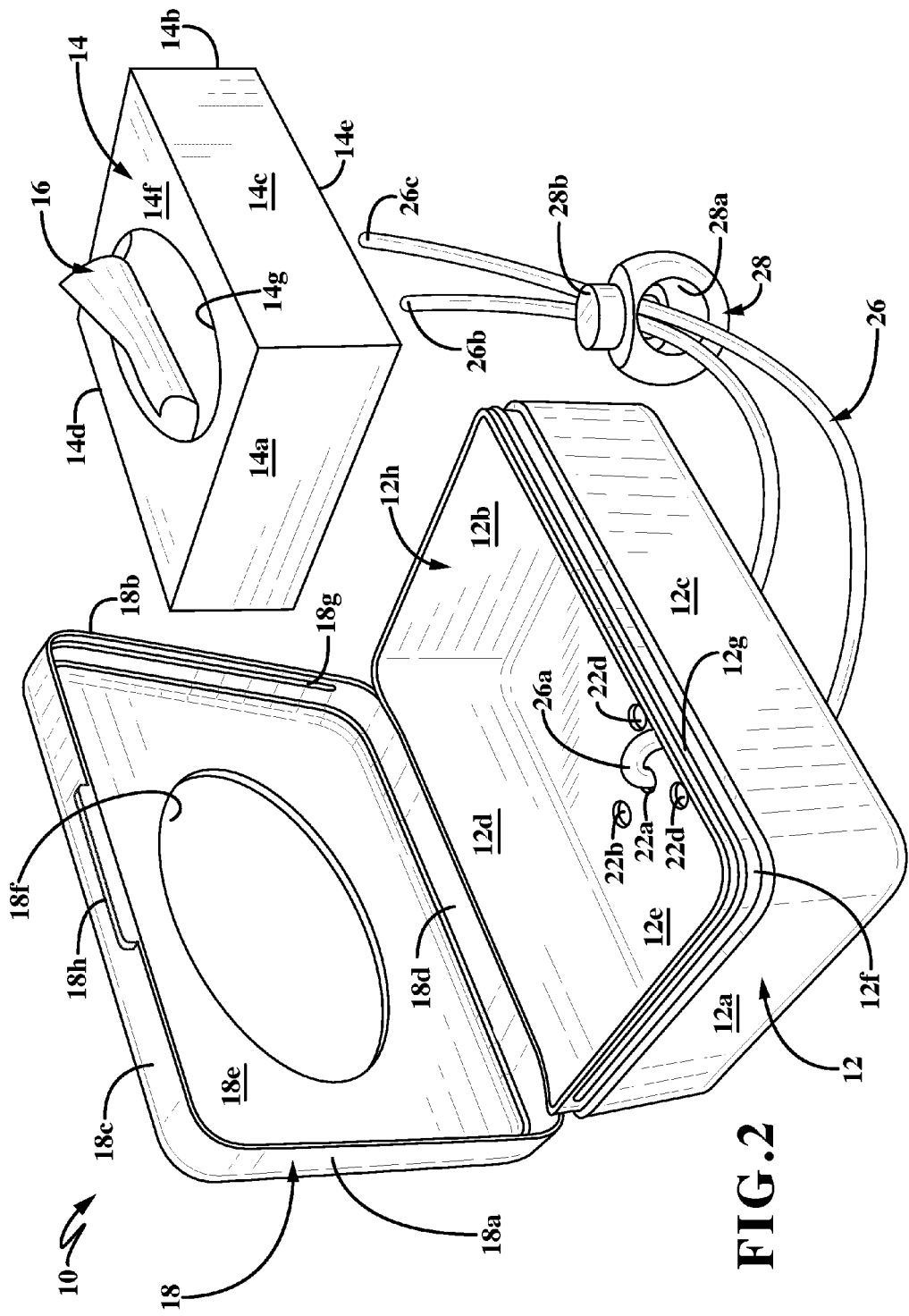
FIG. 2 is an exploded top perspective view of the dispenser with the box containing the pet waste disposal bags removed from the outer housing.

Housing 12 is shown in FIG. 1 in a closed position and in FIG. 2 in an open position. Housing 12 preferably is formed of a lightweight plastic material and may have a rectangular parallelepiped configuration with a pair of side walls 12a and 12b, a front wall 12c, a back wall 12d, and a bottom wall 12e. (It will be understood that housing 12 may be differently shaped instead of being generally rectangular. For instance, the exterior of housing 12 may be generally oval in shape.)

A recessed upper end 12f is provided on walls 12a-12d and a rib 12g is provided on an exterior surface of upper end 12f. Side walls 12a, 12b, front and back walls 12c, 12d, and bottom wall 12e bound and define an storage compartment 12h (FIG. 2) within which box 14 and thereby bags 16 are received or just a stack of bags 16 alone are received. Bottom wall 12e may be flat or planar (particularly the exterior surface of wall 12e) so that wall 12e will readily abut and remain in contact with an exterior surface of a leash, collar or other surface upon which housing 12 is engaged. This is in stark contrast to previously known dispensers that are generally circular in cross-section and therefore cannot lay flat against a surface of a collar or leash. It will be understood that bottom wall 12e may present any surface suitable to aid housing 12 to closely abut and rest against an exterior surface of the leash, collar or article to which the dispenser is engaged.

A lid 18 is pivotally mounted on back wall 12d by one or more hinges 20. The one or more hinges 20 may bee living hinges, although the hinges could have other types of constructions. Lid 18 may have a rectangular configuration with side walls 18a, 18b, a front wall 18c, a back wall 18d, and a top wall 18e. Top wall 18e defines an opening 18f therein and this opening 18f may have an oval-shaped configuration, although other configurations may be utilized instead (such as rectangular). A rib 18g extends inwardly from inner surfaces of one or more of side walls 18a, 18b, and front wall 18c of lid 18. Rib 18g is positioned to interlockingly engage or snap-fittingly engage rib 12g on housing 12.

The exterior surface of front wall 18c preferably has a detent 18h formed thereon and extending outwardly therefrom. Detent 18h may be engaged to move lid 18 from a closed position (FIG. 1) to an open position (FIG. 2). Detent 18h may be molded integrally with front wall 18c or may be a separate component that is secured thereto. The shape of detent 18h may be changed from what is illustrated in the attached figures to change the overall appearance of dispenser 10.

Figure 3:
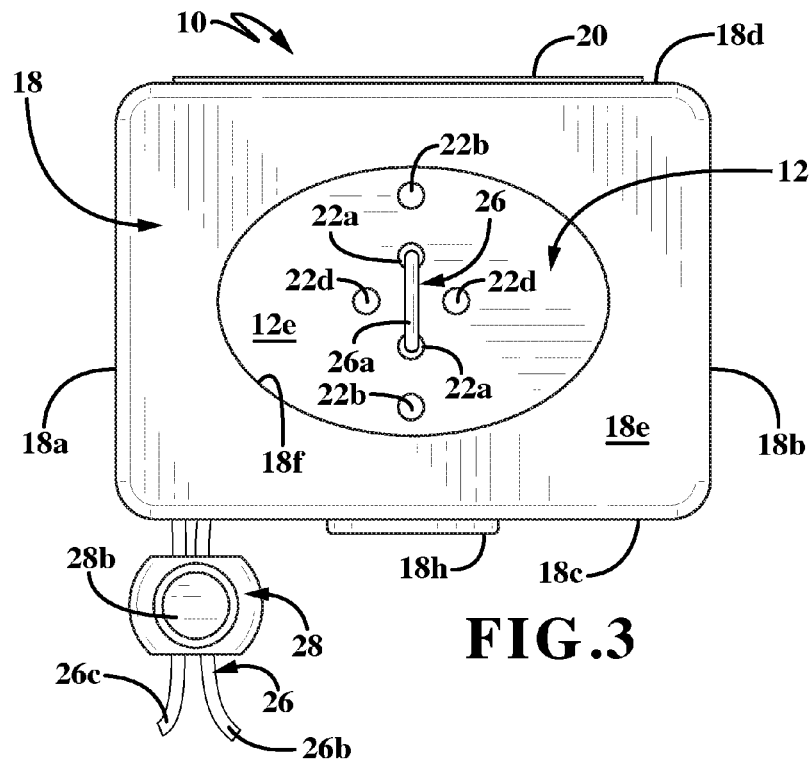
FIG. 3 is a top plan view of the dispenser with the box containing the pet waste disposal bags removed therefrom and showing the engagement of the cord therewith.
Figure 4:
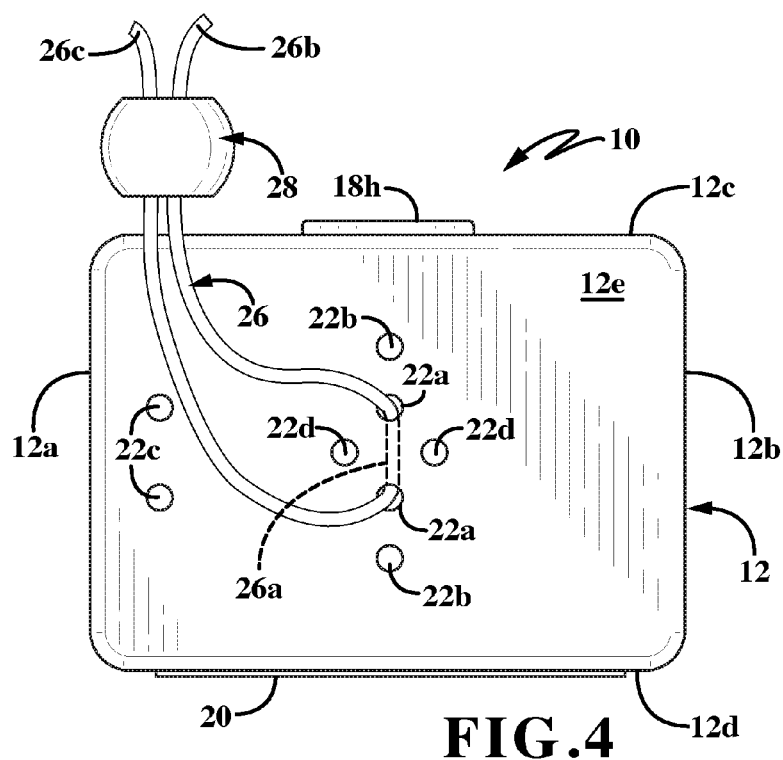
FIG. 4 is a bottom plan view of the dispenser showing the engagement of the cord therewith.
Figure 5:
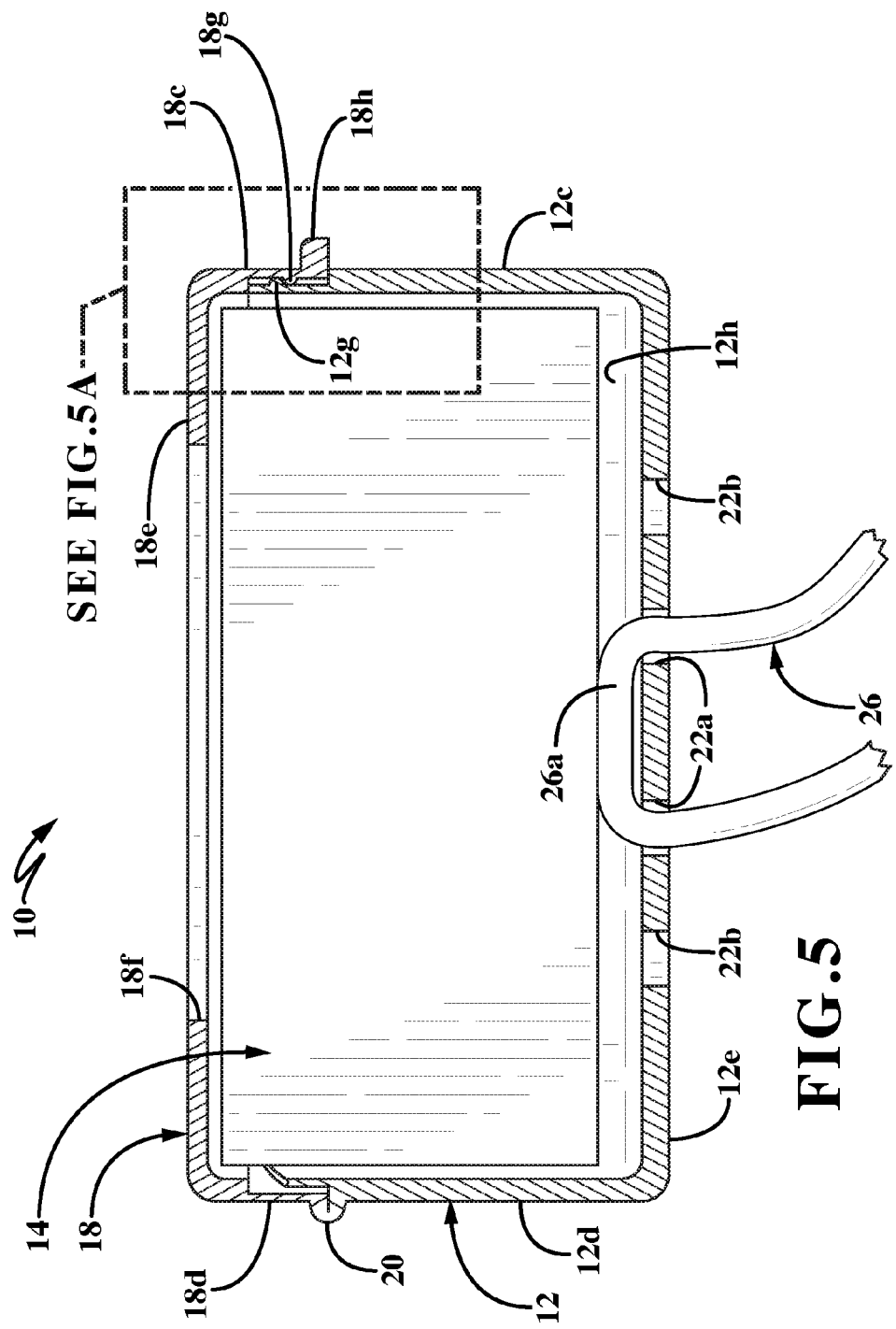
FIG. 5 is a cross-section of the dispenser taken along line 5-5 of FIG. 1.
Figure 5A:
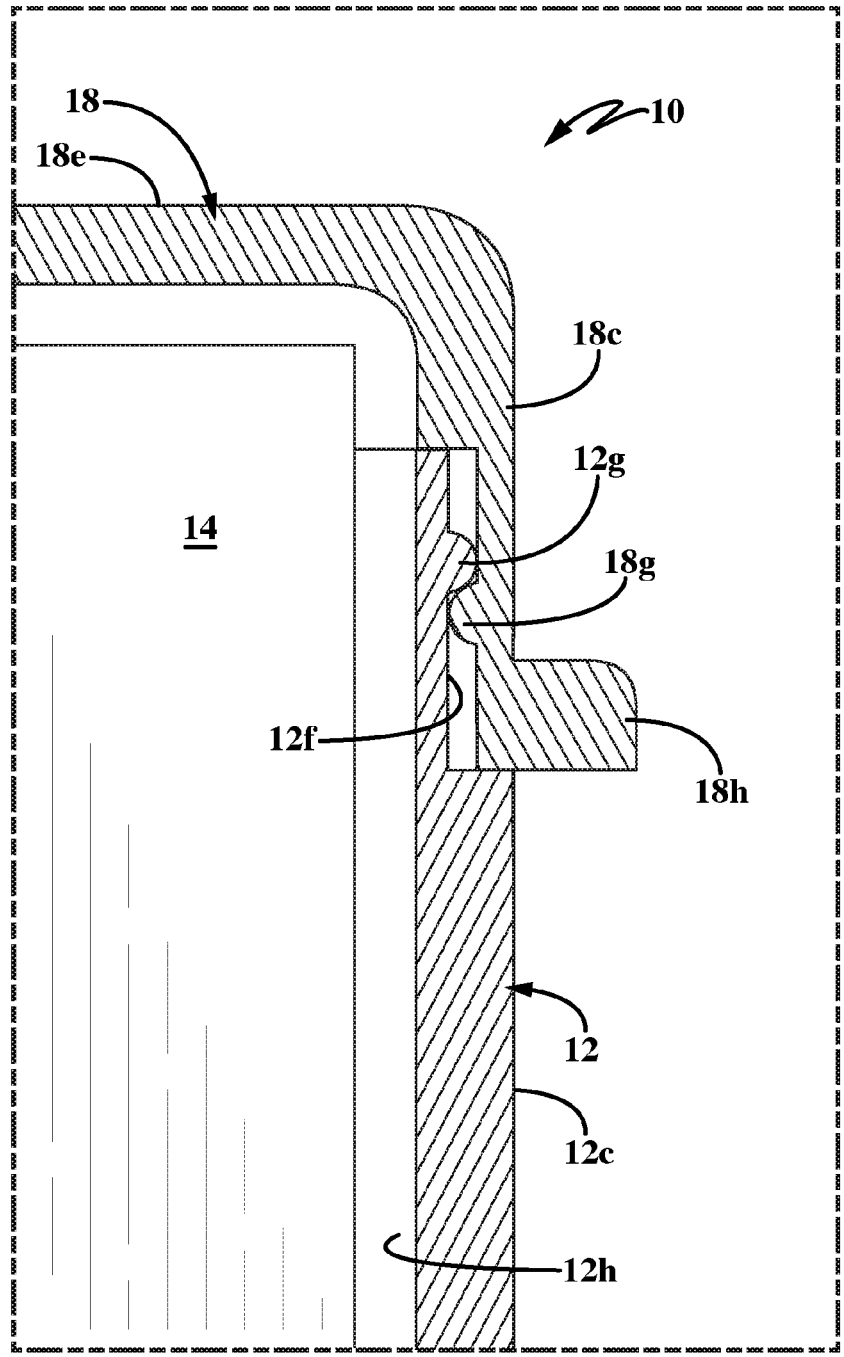
FIG. 5A is an enlargement of the highlighted region of FIG. 5.

FIGS. 2-5 show that bottom wall 12e of housing 12 has a flat exterior surface and that a plurality of holes 22a-22d is defined in bottom wall 12e with each of these holes extending from an exterior surface of bottom wall 12e to an interior surface thereof. It will be understood that only two holes 22a-22d may be defined in bottom wall 12e or additional holes beyond those illustrated in these figures may be defined in bottom wall 12e. The positioning of holes 22a-22d may also be other than what is illustrated in these figures. The positions of the holes 22a-22d through which cord 26 is selectively threaded are selected based on how the user would like to engage dispenser 10 on a leash 30 or collar 32 as will be later described herein. Some or all of holes 22a-22d may be reinforced by a boss 24 (FIG. 3). Two pair of holes 22a, 22d (FIG. 4) may be defined in a generally central region of bottom wall 12e and be arranged in the cardinal directions relative to side walls 12a, 12b, front wall 12c, and back wall 12d. At least one additional hole 22b may be defined between the four holes 22a, 22d and front wall 12c and/or between the four holes 22a, 22d and back wall 12d. A further pair of holes 22c may be defined proximate one or the other or both side walls 12a or 12b. It will be understood that any other desired placement or configuration of holes 22a-22d may be provided in bottom wall 12e of housing 12. The user will select which pair of holes to use for securing housing 12 to a leash or collar based on the orientation that the user wishes the dispenser to assume. The holes may also be selected based on the width of the leash or collar. Holes 22a will be selected if the leash or collar is narrower and holes 22b will be selected if the leash or collar is wider.

A cord indicated, generally at 26, is threaded or looped through at least two of the holes 22a-22d in housing 12. Cord 26 forms a loop 26a that abuts an interior surface of bottom wall 12e of housing 12 and is therefore positioned beneath box 14 if box 14 is received within compartment 12h of housing 12. A length of cord including free ends 26b, 26c extends outwardly for a distance from each hole 22a-22d in bottom wall 12e through which cord 26 is threaded. Cord 26 may be a single rope or string formed from any suitable material. One such suitable material is an expandable elastic material as this material ensures a tight fit between dispenser 10 and a leash 30 or collar to which dispenser 10 is to be secured (as will be described later herein).

A cord stop 28 may be engaged with cord 26 to lock a length of cord 26 relative to housing 12. Cord stop 28 may be engaged with cord 26 in such a way that the free ends 26b, 26c of cord 26 are threaded through an opening 28a of cord stop 28 and extend outwardly beyond an exterior surface of cord stop 28. Cord stop 28 may include a button 28b that may be depressed to allow lengths of cord 26 to freely pass through opening 28a and thereby permit a user to change the length of cord 26 that extends between housing 12 and lock 28. Button 28b may be spring-biased within cord stop 28.

When button 28b is released, the button 28 returns to its original non-depressed position and clampingly engages sections 26b, 26 of cord 26 within cord stop 28 and thereby fixing the length of cord 26 that extends between housing 12 and cord stop 28.

Box 14 (FIG. 2), if utilized, is of a usual construction and may have a rectangular parallelepiped configuration if to be used in a similarly shaped housing 12. Box 14 is provided with side walls 14a and 14b, a front wall 14c, a back wall 14d, a bottom wall 14e and a top wall 14f. Box 14 may be fabricated from a lightweight paperboard material that is stamped and then folded into its rectangular configuration. As discussed earlier herein, box 14 may be fabricated from other materials or may be omitted from dispenser 10.

The walls 14a-14f of box 14, if utilized, define an interior compartment (not shown) that is accessible through an opening 14g defined in top wall 14f. Box 14 may be of a size and configuration complementary to that of storage compartment 12h of housing 12. When box 14 is received within compartment 12h, top opening 14g may align or substantially align with opening 18f of housing 12 when lid 18 is in the closed position (as shown in FIG. 1.) These aligned openings 14g, 18f permit bags 16 to be individually removed from housing 12. The length, depth, and height of the various walls of box 14 are just slightly smaller than that of the walls which form housing 12 so as to provide a complementary fit therebetween. Opening 14g may be substantially complementary in shape to opening 18f in lid 18; if opening 18f is oval in shape, opening 14g may also be oval in shape.

The compartment defined by box 14 contains the plurality of disposal bags 16 that are arranged in a tissue-style configuration. This configuration enables bags 16 to be individually pulled out of the compartment through opening 14g defined in top wall 14f using only one hand. When one bag 16 is dispensed from housing 12 then a free end of the next bag 16 may extend slightly outwardly from opening 18f in housing 12. If the next bag 16 is not presented in such a fashion then the user may insert a finger and thumb through opening 18f to grasp onto a free end of the next available bag 16 and pull the same outwardly through opening 18f.

Figures 6, 7, 8, 9, 10:
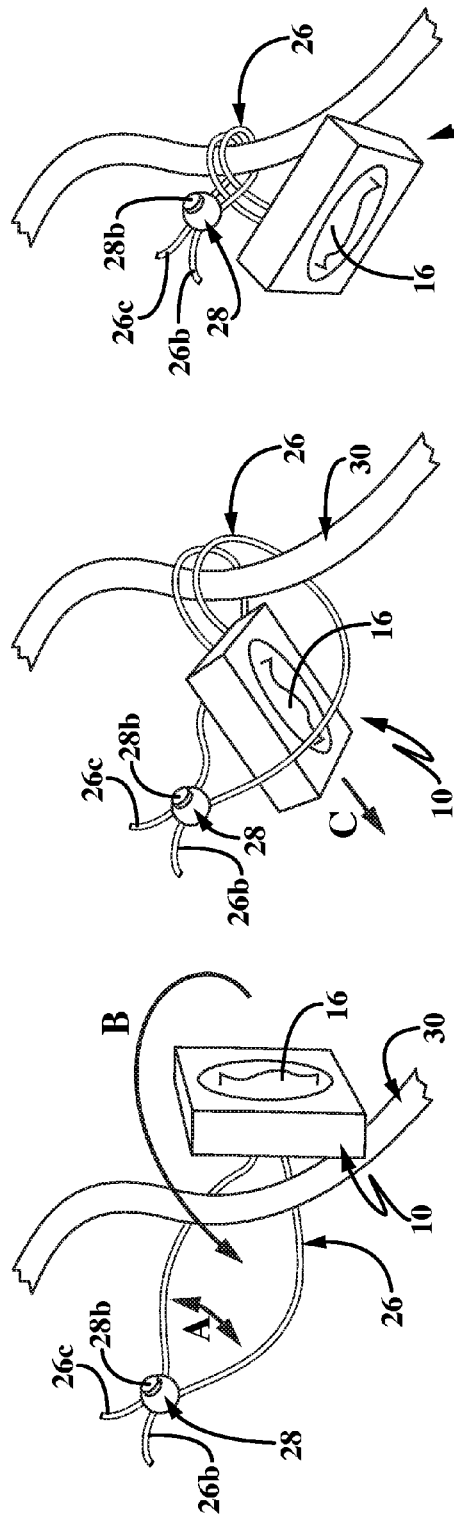
FIGS. 6, 7 and 8 are diagrammatic views showing a method of attaching the dispenser to a dog leash.
FIGS. 9 and 10 are diagrammatic views showing attachment of the dispenser onto the leash without looping the dispenser through the cord.

Dispenser 10, i.e., housing 12 containing bags 16, may be secured to a pet leash 30, collar 32, harness etc. by separating cord sections 26b and 26c in the manner indicated by arrow "A" (FIG. 6), positioning leash 30 on top of the separated sections 26b, 26c and then passing housing 12 over leash 30 as indicated by arrow "B" (FIG. 6) and then through the loop formed by separated sections 26b, 26c (FIG. 7). This type of engagement is similar to how luggage tags may be secured to the handle of a piece of luggage. Once housing 12 is passed through the loop it is pulled in the direction of arrow "C" (FIG. 7) until bottom wall 12e is pulled into a close abutting arrangement with an exterior surface of leash 30 or collar 32 so that housing 12 dangles from leash 30 (FIG. 8). Button 28b on cord stop 28 is depressed and cord stop 28 is moved along sections 26b, 26c of cord until the cord stop 28 contacts leash 30 or collar 32. If cord 26 is elastic in nature the user will pull on sections 26b, 26c to tighten the region of cord 26 that wraps around leash 30 or collar 32 prior to engaging cord stop 28.

In a second and preferred manner of securing housing 12 to leash 30, sections 26b, 26c are separated from each other in the manner indicated by arrow "D" (FIG. 9) and leash 30 is threaded through the so-formed loop. The user will pull on cord sections 26b, 26c until bottom wall 12e of housing 12 is in close abutting contact with leash 30 or collar 32. The button 28b on cord stop 28 is depressed and cord stop 28 is moved in the direction of arrow "E" along cord sections 26b, 26c until adjacent leash 30. When cord stop 28 is adjacent leash 30, button 28b is released and cord 26 is locked in place with bottom wall 12e of housing 12 adjacent leash 30. Again, if cord 26 is fabricated from an elastic material, bottom wall 12e and thereby housing 12 will be even more tightly cinched to leash 30 or collar 32 by cord 26. The elasticity of cord 26 assists in maintaining a tight fit between housing 12 and leash 30. This tight cinching of housing 12 to leash 30 or collar 32 using cord 26, particularly if cord 26 is elastic, makes it possible to position dispenser 10 anyway along the length of a leash 30 or collar 32 in such a way that dispenser 10 will remain at that particular selected location on the leash or collar.

Figure 11A:
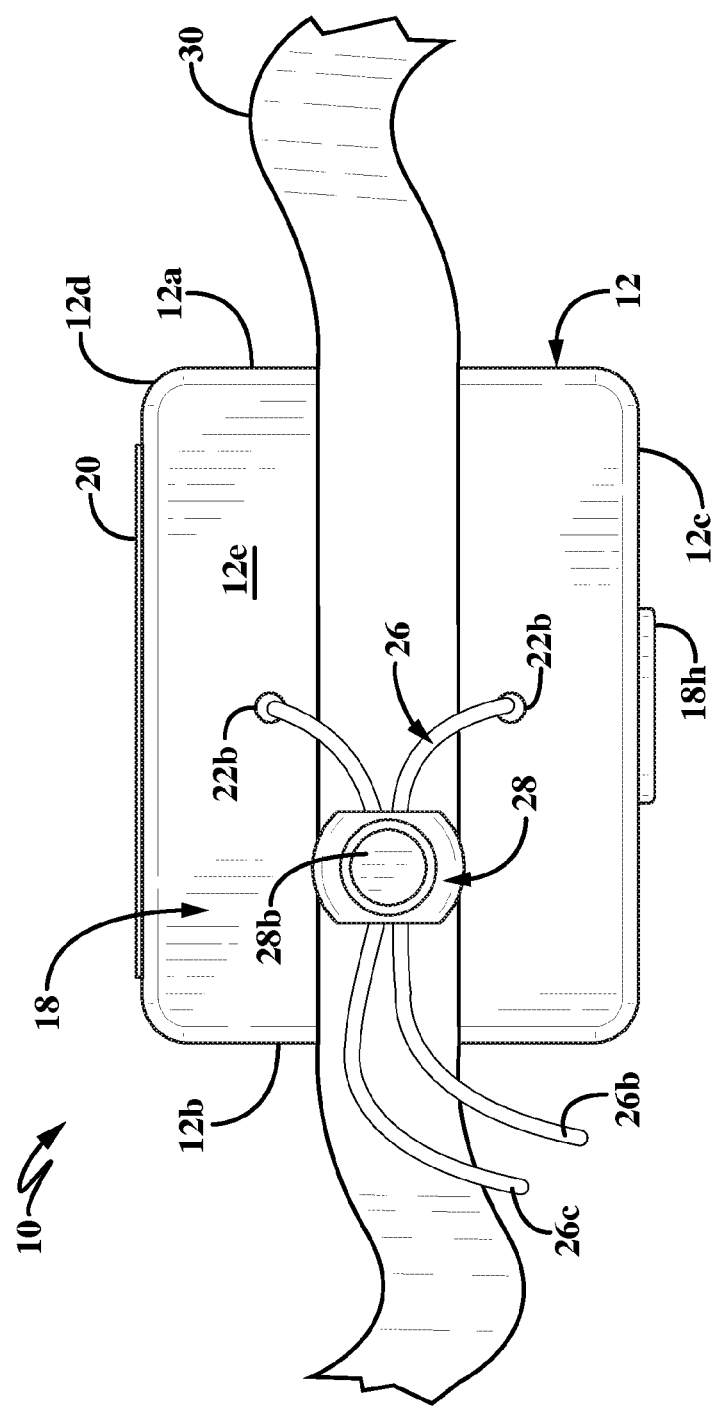
FIG. 11A is an enlarged front elevational view of a first dispenser of FIG. 11 shown in a generally parallel orientation relative to a leash and prior to the cord stop being engaged to tightly retain the dispenser against the leash.
Figure 11B:
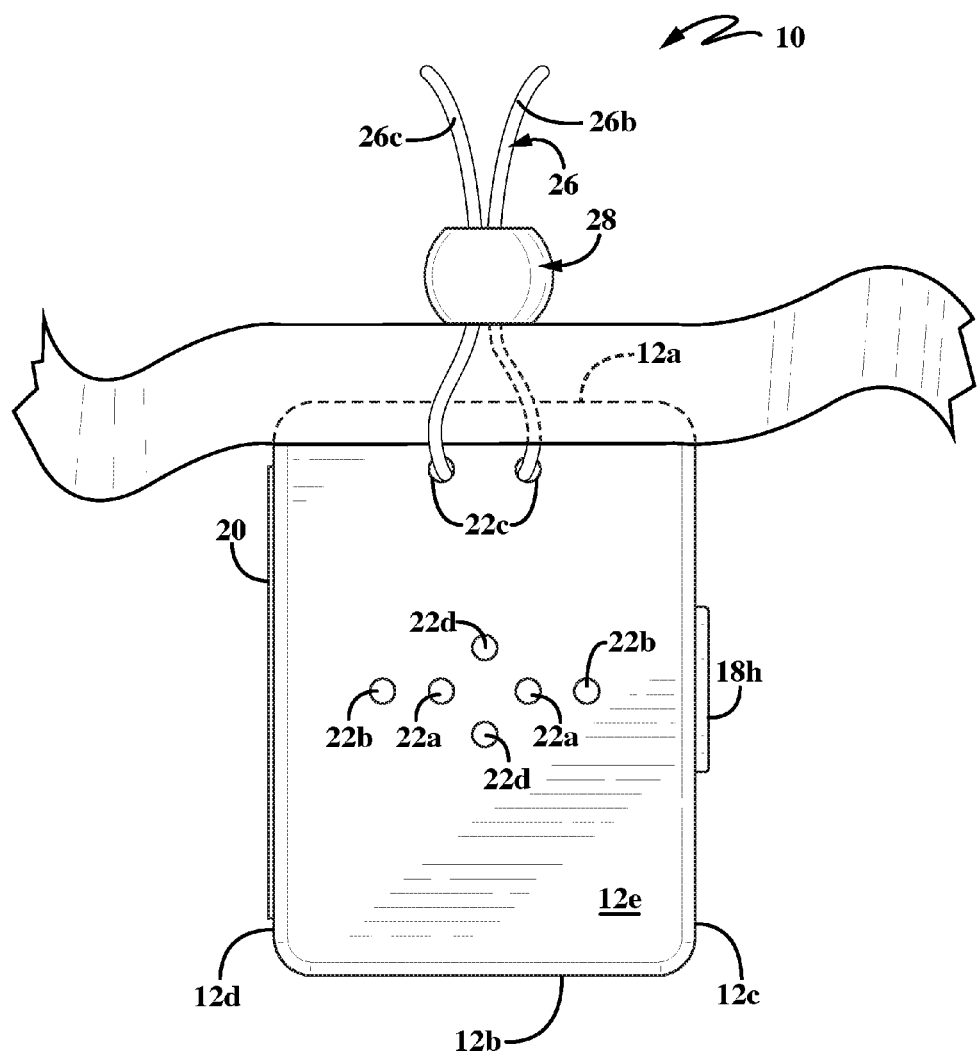
FIG. 11B is an enlarged front elevational view of a second dispenser of FIG. 11 shown in a generally perpendicular orientation relative to the leash and prior to the cord stop being engaged to tightly retain the dispenser against the leash.

The positioning of cord 26 through various combinations of holes 22a-22d in housing bottom wall 12e enables a user to attach dispenser 10 at any desired orientation relative to leash 30 (such as is illustrated in FIGS. 11-11B). The user will select a generally parallel, generally perpendicular or even angled orientation relative to leash 30 (or collar 32 or any other article such as a backpack, bag or purse). The selected orientation may be based on the width of leash 30 or collar 32, the size of the dog or whether it is simply more convenient for the user to use dispenser 10 in one particular orientation over another. The user will select the most appropriate holes 22 in housing 12 through which to thread cord 26 in order to engage leash 30 in the desired orientation and so that the width of the leash or collar is taken into account.

FIG. 11A shows an example of the housing 12 of dispenser 10 engaged on leash 30 in a generally parallel orientation. In this instance, cord 26 is threaded through the pair of apertures 22b located centrally in bottom wall 12e of housing 12. Because of the shape of bottom wall 12e, bottom wall 12e is able to be pulled into close proximity with an exterior surface of leash 30. Cord 26 is cinched tightly so that the bottom wall 12e, which may be flat, lays in abutting contact with the exterior surface of leash 30 and cord stop 28 is then engaged so as to hold housing 12 in close contact with leash 30. FIG. 11A shows cord 26 and cord stop 28 prior to cinching and locking dispenser 10 in place against leash. Once cord 26 is cinched and cord stop is engaged, dispenser 10 and leash 30 will tend to move in unison with each other. Additionally, dispenser 10 remains in the same generally parallel orientation relative to leash 30 until cord stop 28 is disengaged. If the leash 30 is narrower than the one illustrated in FIG. 11A, then cord 26 could be threaded through the two apertures 22a in order to engage dispenser 10 to leash 30 in a generally parallel orientation.

FIG. 11B shows cord 26 threaded through the two apertures 22c proximate end 12a in order to orient dispenser generally perpendicularly relative to leash 30. The figure shows cord 26 and cord stop 28 prior to cinching cord 26 and engaging cord stop. (Threading cord 26 through the two apertures 22d instead of apertures 22c will also orient dispenser 10 generally perpendicularly relative to leash). Apertures 22c are selected when it is desired that the majority of the housing 12 will hang downwardly from leash 30. Apertures 22d are selected when it is desired that housing 12 will be centered on the leash but still be in a generally perpendicular orientation.

If so desired, the user could even engage dispenser on a leash 30, collar 32 or other article in a different orientation such as on an angle (i.e., neither generally parallel nor generally perpendicular). So, for example, the user could thread cord 26 through one of the apertures 22b and one of the apertures 22d and this would orient housing 12 at an angle relative to leash 30. Housing 12 and the various apertures 22a-22d located therein therefore provide the user with a variety of options at mounting housing 12 to leash 30, collar 32 or any other article where they desire to have dispenser bags 16 readily available.

Figure 12:
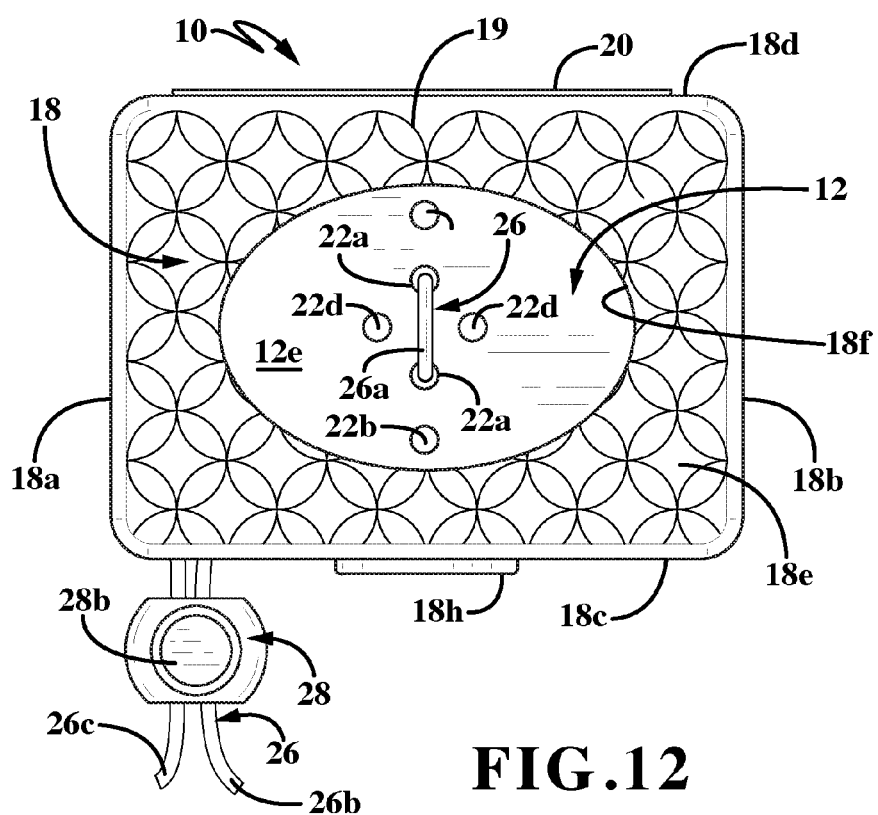
FIG. 12 is a front elevational view of the dispenser showing an exemplary decorative image provided on a front surface of the dispenser.

FIG. 12 is a front elevational view of dispenser 10 showing an exemplary decorative image 19 provided on a front surface 18e of dispenser 10. Decorative image 19 may be any desired image, pattern or color that may or may not include text. Decorative image 19 may take the form of a decal that is adhesively applied to front surface 18e. Alternatively, decorative image 19 may be printed onto front surface 18e. Furthermore, image 19 may be molded into, cut into or applied onto the material used to fabricate front surface 18e so that front surface 18e has a decorative profile that includes peaks and valleys when viewed from a side. While decorative image 19 is shown on front surface 18e, it will be understood that such image 19 may be applied to other portions of the exterior surface of dispenser 10. Decorative image 19 makes dispenser 10 more aesthetically appealing and therefore enhances the appearance of leash 30 or collar 32.

The tissue-style arrangement of disposable bags 16 within box 14, instead of the use of a roll of disposable bags, greatly facilitates removal of individual bags 16 from box 14 with a single hand as opposed to requiring two hands as in formerly known dispenser. The tissue-style arrangement also enables dispenser 10 to be of a more slim fit on a leash or collar rather than the heretofore bulkier constructions used for storing a roll of bags. Thus, by securing housing 12 containing a supply of bags 16 therein to a leash 30, pet collar 32 or pet harness that wraps around the animal's torso, the dispenser 10 and therefore bags 16 will always be readily available when taking the pet 34 for a walk. There is no need for the pet walker 36 (FIG. 11) having to separately obtain the pet waste bags and carry the same to ensure that they are with the walker 36 at all times.

Thus, dispenser 10 including housing 12 and a supply of disposal bags 16 in a tissue-style arrangement, and the use of an attachment cord 26, particularly an elastic cord, provides an extremely lightweight small compact container easily transported when walking a pet 34. Dispenser 10 can remain on leash 30, collar 32, or harness of the pet 34 at all times. After exhausting the supply of bags 16, housing 12 can be moved to an open position (FIG. 2) and a new, replacement box 14 of bags 16 can be placed within housing 12 or a stack of bags 16 may be placed within housing 12 and the lid 18 may be moved to the closed position. This replacement of bags 16 can occur without disengaging housing 12 from leash 30 or collar 32 (or harness).

Constructing housing 12 of a lightweight plastic material, which may be mass-produced extremely inexpensively, and filling it with an easily and economically manufactured lightweight paperboard box or pouch 14 containing a plurality of inexpensive bags 16, provides an extremely functional pet supply at a relatively low cost, yet ensures that the waste disposal bags 16 are always with the dog walker 36 for retrieving and subsequent disposal of pet waste. Furthermore, the use of cord 26 enables housing 12 to be easily attached and maintained at and on various pieces of equipment used when walking the dog 34 or other animal.

In a preferred embodiment, side walls 12a and 12b may have a length in the range of 2¼ inches to 3¼ inches with a preferred length of 2¾ inches, front and back walls 12c and 12d will be in the range of 1¾ inches to 2⅝ inches with a preferred width of 2⅛ inches and the overall height of walls 12a-12d and lid walls 18a-18d when closed will be in the range of ¼ inch to 1½ inches with a preferred height of 1 inch.

It will be understood that while holes 22a-22d are disclosed as being defined in bottom wall 12e of housing 12, holes for cord 26 may alternatively be provided in the side walls 12a-12d of housing 12. Any holes located in positions that allow securement of cord 26 to housing 12 may be utilized.

It will further be understood that in some embodiments, lid 18 may be permanently engaged with housing 12, being secured thereto during fabrication. In this instance, dispenser 10 may be entirely disposable, being thrown away once all bags 16 within its interior are depleted. In this instance, the entire housing 12 may be fabricated from a less expense and less durable material. So, while dispenser 10 is contemplated as being a reusable and refillable container, dispenser 10 could not be reusable or refillable.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration set out herein are an example and the invention is not limited to the exact details shown or described.

The invention claimed is:

1. A dispenser for retaining pet waste disposal bags on an animals leash or collar, said dispenser comprising:
   a housing formed with an interior compartment, a lid moveable between open and closed positions; and a bottom wall opposite the lid; wherein the bottom wall has a flat exterior surface that is adapted to remain in close abutting contact with an exterior surface of the leash or collar;
   an opening formed in the lid providing access to the interior compartment;
   a cord engaged with the housing and adapted to assist in retaining the bottom wall against the exterior surface of the leash or collar; wherein the cord is formed of an elastic material;
   a cord stop provided to lock the cord in a fixed position relative to the housing; and
   wherein a pair of holes is defined in the housing and wherein the cord is looped through said pair of holes providing a pair of cord sections extending from the housing.

2. The dispenser defined in claim 1, in which a cord stop is engaged with the pair of cord sections.

3. The dispenser as defined in claim 1, wherein the pair of holes are defined in the bottom wall of the housing.

4. The dispenser defined in claim 1, further comprising a plurality of disposable bags; wherein the bags are arranged in a stack and are suitable for individual removal from the housing through the lid opening.

5. The dispenser defined in claim 4, wherein individual bags are removable through the opening in the housing using a single hand.

6. The dispenser defined in claim 1 wherein the housing is formed of plastic and the lid is pivotally mounted on the housing by a living hinge.

7. The dispenser as defined in claim 1, further comprising a decorative image applied to some or all of an exterior surface of the dispenser housing.

8. In combination,
a leash for attachment to a pet's collar; and
a dispenser for pet waste disposal bags;
wherein the dispenser includes a bottom wall positionable in abutting contact with the leash or collar; an interior compartment for receiving a stack of the disposal bags; an opening to the interior compartment through which an individual bag from the stack of bags is withdrawn; a cord engaged with the housing and being selectively cinchable about the leash or collar and tightly retaining the bottom wall of the dispenser against the leash or collar; and a cord stop that secures the cord in position relative to the housing.

9. The combination as defined in claim 8, wherein the bottom wall defines a pair of spaced apart holes through which the cord is threaded.

10. The combination as defined in claim 9, wherein the bottom wall defines a plurality of pairs of spaced apart holes, and wherein a first pair of the plurality of pairs of holes is used for receiving the cord so that the dispenser will be generally perpendicularly oriented relative to the leash; and wherein a second pair of the plurality of pairs of holes is used for receiving the cord so that the dispenser will be oriented generally parallel relative to the leash.

11. The combination as defined in claim 9, wherein the bottom wall defines a plurality of pairs of spaced apart holes, and wherein the cord is threaded through a first pair of holes or a second pair of holes; and wherein the holes in the first pair of holes are spaced a first width apart and the holes of the second pair of holes are spaced a second width apart; and the first and second widths are different.

12. The combination as defined in claim 8, wherein the dispenser further comprises a moveably mounted lid; and wherein the opening is defined in the lid.

13. The combination defined in claim 8, wherein the cord is formed of an expandable elastic material.

14. The combination as defined in claim 8, wherein the cord stop includes a spring-biased button that is movable in a first direction to allow a length of the cord extending between the housing and the cord stop to be changed; and wherein the button movable in a second direction to lock the cord in a selected position relative to the housing.

15. A method of dispensing pet waste disposal bags comprising providing a dispenser comprising:
a housing formed with an interior compartment;
a lid on the housing moveable between open and closed positions;
an opening formed in the lid providing access to the interior compartment;
a bottom wall provided on the housing opposite the lid, a cord engaged with the housing; and
a cord stop;
providing a stack of disposal bags;
moving the lid to the open position;
inserting the stack of disposal bags into the interior compartment;
moving the lid to the closed position;
engaging the cord around a section of a pet leash or a pet collar;
moving the housing until the bottom wall rests against a section of the pet leash or the pet collar; and
moving the cord lock to a position where the bottom wall of the housing is retained against the section of the pet leash or pet collar.

16. The method as defined in claim 15, further comprising the step of stretching the cord to pull the bottom wall of the housing into abutting contact with the section of the pet leash or pet collar prior to moving the cord lock.

17. The method as defined in claim 16, further comprising removing a single disposal bag from the dispenser using a single hand.

18. The method as defined in claim 17, further comprising removing the single disposal bag without breaking a line of perforations between the single bag and a next bag in the dispenser.

19. The method as defined in claim 15, further comprising the step of threading a first end or a second end of the cord through a pair of holes defined in the housing prior to inserting the stack of disposal bags into the interior of the housing.

20. The method as defined in claim 19, further comprising selecting the pair of holes in the housing from a plurality of pairs of holes defined in the housing; and wherein the selection is based on a desired end orientation of the dispenser relative to the pet leash, pet collar or other article to which the dispenser is to be engaged; or the selection is based on a width of the pet leash, pet collar or other article to which the dispenser is to be engaged.

21. The method as defined in claim 20, further comprising the step of selecting a generally perpendicular orientation or a generally parallel orientation for the housing relative to the pet leash or the pet collar prior to selecting the pair of holes from the plurality of pairs of holes.

22. The method as defined in claim 15, further comprising:
providing the disposal bags in a box;
inserting the box into the interior of the housing;
withdrawing all of the disposal bags when required;
opening the lid when all of the disposal bags in the box have been removed;
withdrawing the box from the interior of the housing;
throwing the box away;
inserting a new box with new disposal bags therein into the interior of the housing; and
moving the lid to the closed position.

23. A method of dispensing pet waste disposal bags comprising:
providing a dispenser comprising a housing formed with an interior compartment, wherein a bottom wall of the dispenser is configured to abut a portion of a leash, collar or strap, an opening is formed in the housing that provides access to the interior compartment, a stack of disposal bags disposed within the interior compartment; a cord loop extending from the housing, and a cord stop;
threading a section of a pet leash or pet collar through the cord loop;
moving the housing until the bottom wall is in abutting contact with the pet leash or the pet collar;
moving the cord lock to a position where the bottom wall of the dispenser is retained in abutting contact with the pet leash or pet collar;
walking or running the pet while the dispenser is engaged with the leash or collar; and
moving the dispenser in unison with the leash or collar while walking or running the pet.

24. The method as defined in claim 23, further comprising:
stopping periodically for the animal to eliminate waste;
withdrawing a single bag from the dispenser by pulling the single bag out of the opening in the housing and using a single hand.

25. A dispenser for retaining pet waste disposal bags on an animals leash or collar, said dispenser comprising:

a housing formed with an interior compartment, a lid moveable between open and closed positions; and a bottom wall opposite the lid; wherein the bottom wall is adapted to remain in close abutting contact with an exterior surface of the leash or collar;

an opening formed in the lid providing access to the interior compartment;

a cord engaged with the housing and adapted to assist in retaining the bottom wall against the exterior surface of the leash or collar;

a cord stop provided to lock the cord in a fixed position relative to the housing; and wherein a pair of holes is defined in the housing and wherein the cord is looped through said pair of holes providing a pair of cord sections extending from the housing.

* * * * *